United States Patent [19]

Lipinski et al.

[11] Patent Number: 4,485,690
[45] Date of Patent: Dec. 4, 1984

[54] AUTOMATICALLY OPENABLE AND RECLOSEABLE PROTECTIVE COVER FOR ELONGATED ELEMENTS HAVING A TRAVELING STRUCTURE PROJECTING THEREFROM

[75] Inventors: Reinhard Lipinski, Plochingen; Karl Neff, Waldenbuch, both of Fed. Rep. of Germany

[73] Assignee: PROMA Produkt-und Marketing-Gesellschaft m.b.H., Plochingen, Fed. Rep. of Germany

[21] Appl. No.: 447,522

[22] Filed: Dec. 7, 1982

[30] Foreign Application Priority Data

Jan. 15, 1982 [DE] Fed. Rep. of Germany ....... 3201058

[51] Int. Cl.³ .............................................. F16P 1/00
[52] U.S. Cl. ................................ 74/609; 74/424.8 R; 82/27
[58] Field of Search ..................... 82/27; 408/710, 137; 409/134, 254; 74/608, 613, 609, 614, 424.8 R; 308/3.5; 29/DIG. 94, DIG. 56

[56] References Cited

U.S. PATENT DOCUMENTS

| 1,981,682 | 11/1934 | Volger | 82/27 |
| 2,227,404 | 12/1940 | Zimmermann | 409/134 |
| 3,142,201 | 7/1964 | Geyer | 82/27 |
| 4,085,625 | 4/1978 | Jung | 82/27 |
| 4,195,538 | 4/1980 | Brown | 82/27 |
| 4,376,543 | 3/1983 | Sakagami | 308/3.5 |

FOREIGN PATENT DOCUMENTS

| 1692169 | 8/1954 | Fed. Rep. of Germany. |
| 1883255 | 11/1963 | Fed. Rep. of Germany. |
| 2103657 | 9/1972 | Fed. Rep. of Germany. |
| 634909 | 11/1978 | U.S.S.R. ............................... 409/134 |

Primary Examiner—Leonidas Vlachos
Assistant Examiner—Jerry Kearns
Attorney, Agent, or Firm—Frishauf, Holtz, Goodman & Woodward

[57] ABSTRACT

To form a protective cover for an elongated machine element, such as a feed spindle or the like (1), a tubular structure (7) which may be formed of a plurality of parallel strips (7a) has edges which are formed with an interengaging, interlocking but separable ridge or ribgroove construction (10, 9) similar to a slide fastener. To provide for secure interengagement and covering of a traveling element (2-4) on the spindle, a guide cone (16) is secured to the traveling element surrounding the tubular structure. The guide cone may include a hub (4) formed with a part-circumferential opening or openings (15) through which the opened guide tube portions can pass to permit the traveling element to move while providing continuous protection to the spindle upon movement thereof, the guide cone insuring reclosing of the rib-and-groove behind the movable element, and opening in advance thereof. The tube may be formed, in addition, with longitudinal guide grooves (23) in which closing elements can engage (FIGS. 8-11).

20 Claims, 11 Drawing Figures

FIG. 1

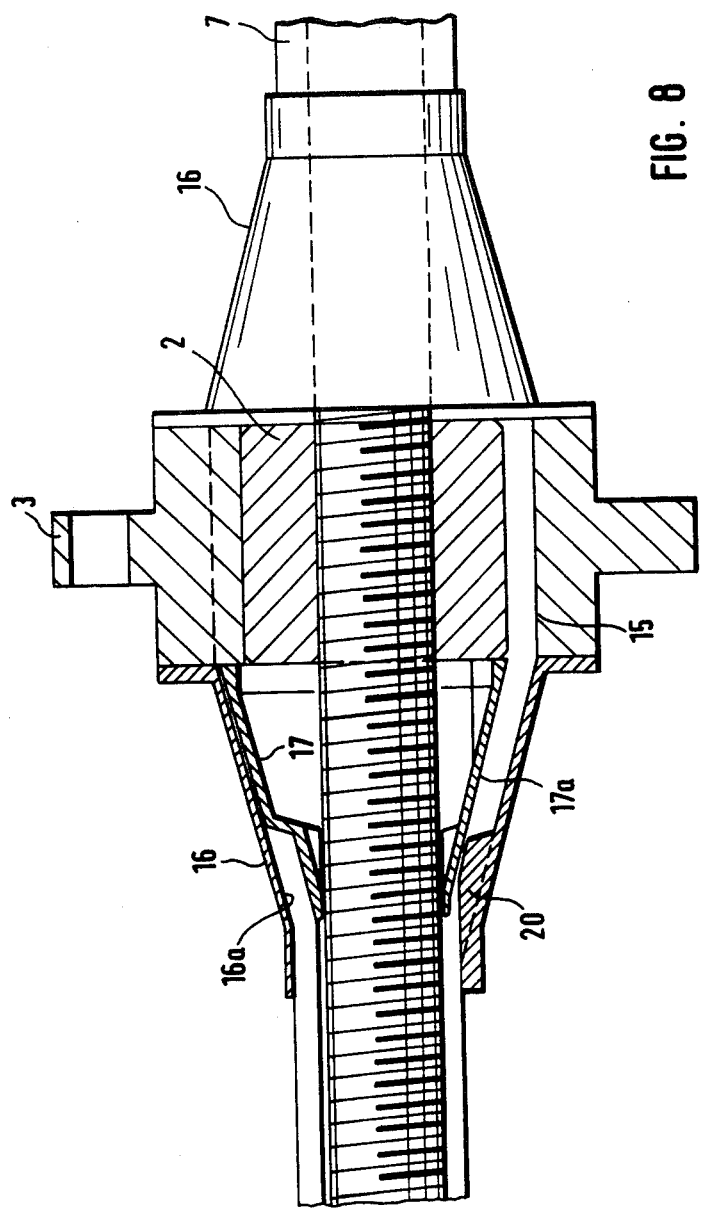

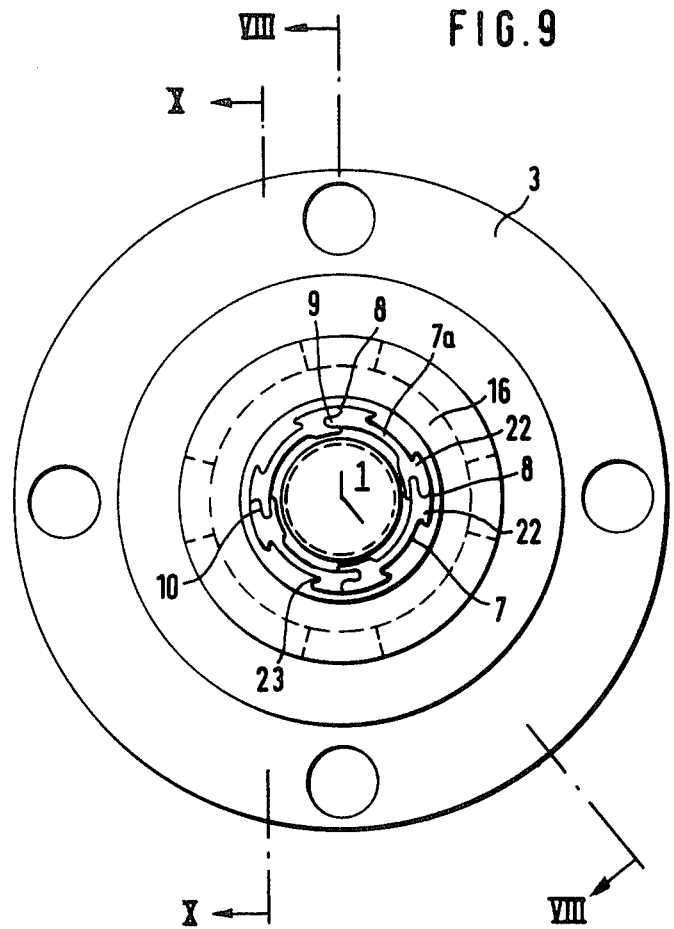

AUTOMATICALLY OPENABLE AND RECLOSEABLE PROTECTIVE COVER FOR ELONGATED ELEMENTS HAVING A TRAVELING STRUCTURE PROJECTING THEREFROM

The present invention relates to a protective cover for spindles, and other elongated machine parts from which a traveling element projects, so that the cover has to open and close in advance of, and behind the element, as the traveling element moves therealong.

BACKGROUND

Covers of the type in which a traveling element can project through the cover, and in which the cover effectively protects the elongated element, while still permitting movement of the projecting element, have previously been proposed. Such covers may have a closure which has an elongated slit, with edges formed similar to a slide fastener edge. One edge may have a longitudinally extending groove into which a longitudinally extending rib can engage, the movable element projecting between the groove and the rib when they are separated, the groove and the rib splitting in advance of the transversely projecting element as it moves, and reclosing therebehind.

A protective cover of this type has been described in German Pat. No. Publication U-18 83 255. This structure is designed particularly for elongated scales secured to machine tools to protect the scales against contamination and deposit of oil and oily residues and substances and the like thereon. The cover is formed of two foil-like strips which are joined together similar to a slide fastener, attached at their edges to the bed of the machine which carries the scale. This requires the bed of the machine to be constructed with a longitudinal groove or the like, or with projecting ribs located at both sides of the scale rod in order to permit attachment of the foils, and to space the foils from the scaling rod. Such a cover is not suitable for use with moving elements, such as spindles, shafts or feed screws.

Cross slides or supports which are driven by feed screws in parallel with the bed of a machine tool preferably should be protected against contamination, dirt, splashing oil and the like. The feed screws or spindles, thus, should be covered throughout their length. Feed spindles, particularly of precision machine tools, are also subject to damage or inaccuracies in operation by chips and spirals of cut material removed in machining operation, and carried about, for example, by cooling fluids. Protective covers have been proposed which still permit passage of a drive element for a cross slide thereto by leaving open regions through which the cross slides can pass. Such covers all have the disadvantage that gaps are left through extended portions of the spindle through which contaminants may enter.

It has been proposed to cover spindles, columns, feed screws and the like by placing bellows therearound. The bellows, in order to accomodate the substantial length, will have a substantial diameter when collapsed, so that the ratio of outer diameter to the diameter of the feed screw or spindle or element which they are protect is undesirable. In order to obtain a reasonable length of bellows, when extended, the outer diameter becomes so large that difficulties in placement of spindles and drive feeds will result. Further, if the stroke of the traversing element, for example a cross slide, is long, the bellows must be spaced from the moving cross slide or feed screw from the inside by spacing spiders, or from the outside by means of holders and guide eyes. These structures are space-consuming and frequently cause operating difficulties. It has also been proposed to use spiral-spring covers which include a spiral spring wound about itself and made of hardened sheet spring steel, surrounding the spindle, and collapsing into itself upon movement of the cross slide on the spindle. Such spiral spring covers cannot be introduced into machine tools without additional attachment fittings. They cannot be placed independently of the position of the spindle to be protected. For example, if such a spiral is installed in a vertical position, some arrangement must be made to prevent collapse of the spiral loops within each other and spreading of spiral loops; the protective function would then not obtain. Additionally, as the spiral spring is extended, a rotary or twisting movement will result which must be compensated for by suitable bearing flanges at the ends of the spiral spring. Longer spindles can be protected only by coupled multiple or stacked spiral springs. The arrangement and placement of such elements is complex and expensive.

It has also been proposed to cover elongated machine elements using high-quality rust-resistant or rust-free spring steel or plastic material in form of a tape or ribbon which is wound, in spiral manner, on the spindle to be protected, and which is guided in the region of the cross slide over deflection rollers, around the cross slide or spindle nut. Upon relative rotation between the spindle nut and the spindle, the ribbon or tape will wind off from one side and wind on on the other, in dependence on the direction of rotation of the spindle, and the direction of thread cut. The width of the covering tape or ribbon must correspond to the pitch of the thread of the spindle which is to be protected. Consequently, different cover tapes must be provided for different feed screw pitch dimensions. Reliable winding-off and winding-on of the cover tape can be assured only if longitudinal stretching of the cover tape is compensated by a tensioning device which, together with the deflection rollers, must be in turn protected by a separate housing in order to prevent interference with proper rolling-off and rolling-on of the tape or ribbon. The entire structure is complex and requires a substantial number of components.

THE INVENTION

It is an object to provide a protective cover, suitable for shafts, spindles, feed screws and the like, from which a movable element projects, for example a traverse nut, cross slide, or the like, which is inexpensive, can readily be constructed in any desired length, and which is stable regardless of application, while providing a complete and effective closed protective cover for the spindle or other elongated element.

Briefly, in accordance with the invention, the cover is a tubular structure which, in cross section, has a closed ring shape, for example and preferably circular. The structure has at least one longitudinal slit which is bounded at adjacent edges by interengaging projection-and-recess means, such as a ridge on one edge and a groove on the other. To provide for separation of the respective edges, as the cross slide travels, and reclosing therebehind, a funnel-shaped structure is provided, surrounding the tubular protective cover and forming a guide cone for the tubular protective cover in the region of separation and reclosing of the tubular structure, that is, reinsertion of the rib or ridge into the groove.

The cover is completely and reliably closed at both sides of the movable element, for example a traveling nut or cross slide. The arrangement can readily be so made that the longitudinal slit is tight wih respect to dust, sprayed cooling fluid, lubricant, and the like. The cover tube does not move along the elongated machine element, for example a spindle, as a folding bellows does; rather, the cover tube remains in place, and thus can be used for spindle drives of any desired length. In accordance with a feature of the invention, the cross slide has the funnel-shaped closing and opening cone elements which, only, spread and reclose the interengaging edges of the cover. No limits, thus, are placed on the length of the cover. The cover can be made of materials which give a suitable structural strength and stability, and can be dimensioned in various diameters so that, with only a few diameters, many different machine spindles and elements can be reliably protected. It is possible to make the cover so large that it can be stood on or walked on, and of materials of suitable strength, such as plastics or metals, coated, or uncoated, to be resistant to chemical or corrosive attack by substances with which the cover might come into contact.

For many applications, the cover is made of plastic; the engaged strip and engaging strip can be integrally molded therein; it is, however, also possible to make the cover of a rigid material, such as metal, for example aluminum, and to apply a somewhat resilient strip on at least one of the interengaging projection-and-recess means, for example a resilient strip defining a groove into which a headed projecting strip can engage, permitting continuous separation, and reintroduction of the respective edges.

In accordance with a feature of the invention, one of the strips has an essentially wedge-shaped cross section with a lesser thickness dimension at the root thereof, and with a rounded or inclined facing end surface, fitting into a groove which extends around the head of the ridge. It is, of course, also possible to vary the shape of the strip and the ridge, for example to so shape them that the projection has an essentially circular cross section, fitting into a groove which has an overlapping projecting edge of part-circular cross section.

The cover can be made as a single tubular element of essentially circular cross section or of a different cross section, for example elliptical; it can also be constructed in the form of a tubular element which has a plurality of axially extending parallel slits, each one of them bounded by a projecting ridge-and-groove set, and adapted to cooperate with an associated opening-and-reclosing cone or funnel structure.

The cone which effects separation, reclosing, and guidance for the tubular element, and which is essentially funnel-shaped, can be so constructed that, upon longitudinal movement of the longitudinally movable element, for example a traveling nut, the cover strip is continuously reinserted or re-locked and so guided that the projecting strip continuously engages into the groove of the opposite edge, whereas, at the other side of the movable element, the groove-and-ridge interlock is separated. The guide cone can be so constructed that it includes closing-and-separating elements located in the interior thereof and having wedge-shaped converging surfaces, positioned to engage the guide tube at both sides of the longitudinal slit. These guide shoulders can be formed with a trough-like guide groove which engages in associated surfaces of the respective closing segment, thus insuring reliable and tight reclosing of the slit even under severe operating conditions. Such guide shoulders can be located only on the inside, or only on the outside, or on both sides, in the form of projections to provide for tight closing of the cover strip, free from gaps when in closed condition.

Each one of the guide cones can have coaxially positioned inner and outer cone elements, the cover tube being guided between the inner and outer cone elements. The closing and opening segments or portions can then be secured, respectively, to the inner, or the outer cone element, or to both. The closing and guide cone elements are simple structural units which can easily be injection-molded, for example made of plastic, or readily manufactured by casting and minor machining from aluminum. No specific attachments are needed which require complex holders or brackets on the movable element; the guide cones can merely and simply be secured to the movable element by holding screws.

DRAWINGS

FIG. 8 illustrates another embodiment of the invention, in longitudinal section, taken along the angled section line VIII—VIII of FIG. 9;

FIG. 9 is an end view of the structure of FIG. 8, omitting features not necessary for an understanding of the invention;

DETAILED DESCRIPTION

Figure 1:
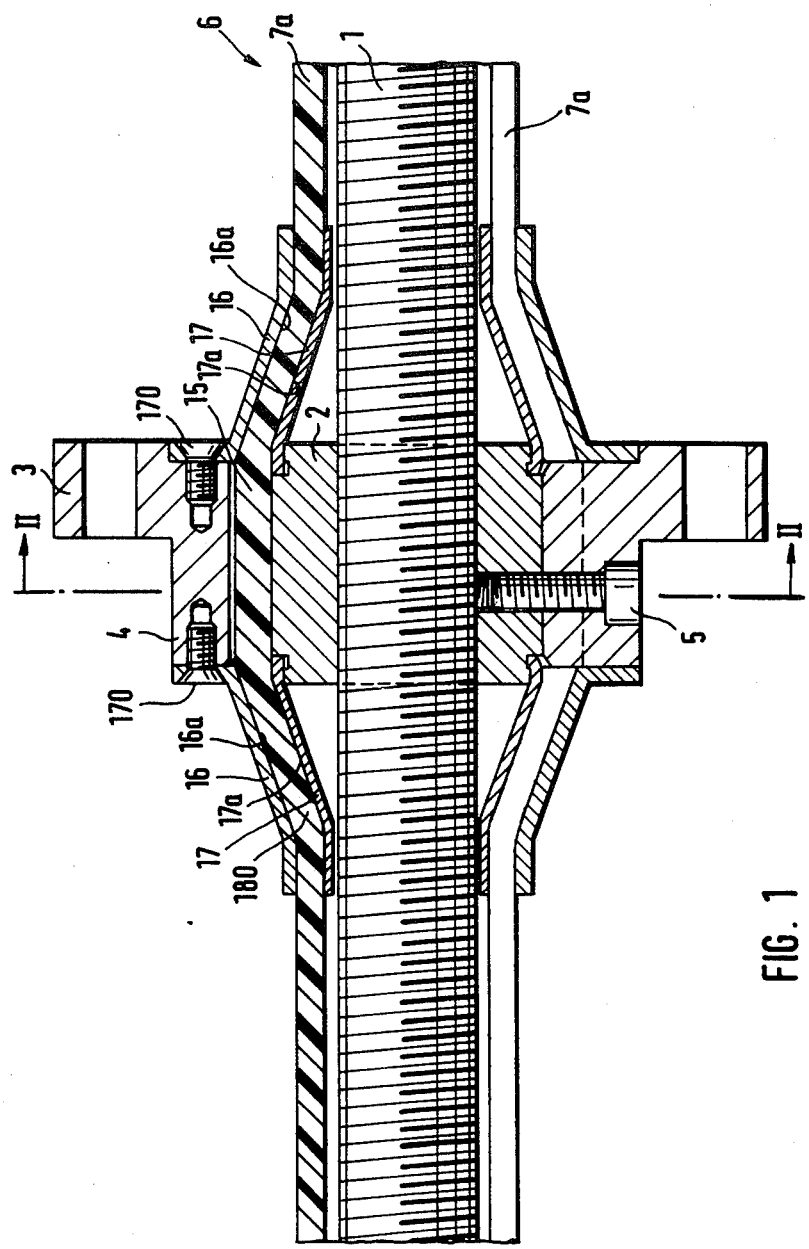
FIG. 1 is a schematic cross section through a spindle drive with a cover, the section being an angle section along line I—I of FIG. 2.

The protective cover is generally shown in FIGS. 1, 2 and 8, 9, respectively, and protects a threaded spindle 1 on which a spindle nut 2 can travel in longitudinal direction. Spindle nut 2 has a ring flange 3 secured thereto by a hub 4. Ring flange 3 is intended to and provided for attachment to a machine element, for example a cross slide. Screws 5 connect the nut 2 to the hub 4 (see FIG. 1). Rotation of the nut is prevented by a suitable guide element, as well known. The spindle nut 2, together with flange 3 and the hub 4, forms a movable projecting element, extending from the spindle 1, and movable longitudinally upon rotation of the spindle 1.

Spindle 1 is covered all around by a protective cover 6. Protective cover 6 forms a cover tube 7, shown in greater detail in FIG. 3.

Figure 3:
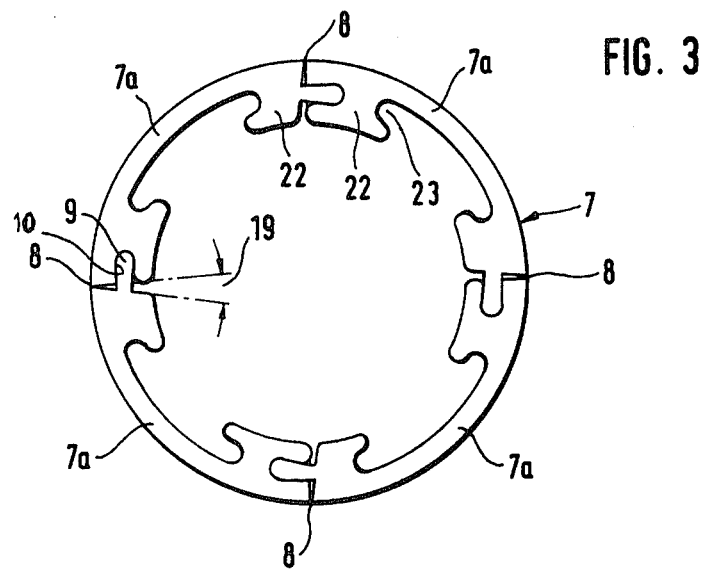
FIG. 3 is an end view of a four-element cover tube as used, for example, in the drive of FIG. 1, shown in closed position.
Figure 5:
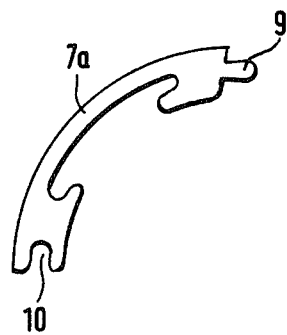
FIG. 5 is a fragmentary end view of the cover tube used in the structure of FIG. 2.
Figure 6:
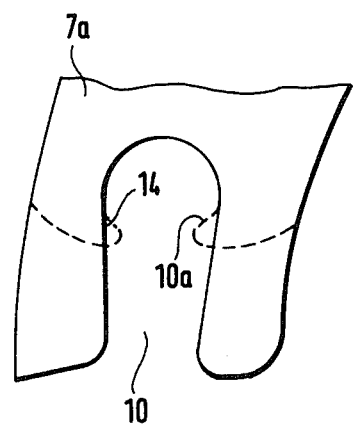
FIG. 6 is a greatly enlarged end view of the groove of the tube.
Figure 7:
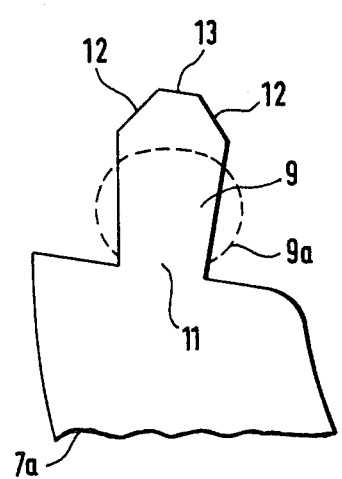
FIG. 7 is a greatly enlarged view of the projecting ridge of the tube.

The cover tube 7 is a tubular element, extending in form of a hose or in form of a rigid tube around the spindle 1; it is of essentially circular cross section, entirely closed, in ring shape, so that the spindle 1 is protected throughout its entire circumference. As shown in FIG. 3, the cover 7 is formed of four cover elements 7a, in the form of continuous strips or ribbons, which are all identical. One of those sections or elements, forming a quadrant, is shown to enlarged scale in FIG. 5. As best seen in FIG. 3, when the cover tube 7 is closed, the respective elemental strips 7a are separated from each other by longitudinal slits 8; tube 7 is closed off with respect to the outer circumference free from gaps or openings. The strips 7a are formed with interengaging projection-and-recess elements, extending throughout their length. One of the strips is formed with a projecting rib 9, whereas the matching edge of the adjacent strip is formed with a groove 10. FIGS. 6 and 7 illustrate, in detail, the shapes of the strips 9 and the grooves 10. The strips 9 have a lesser thickness at root 11 than at the head portion 13, and have inclined engaging edges or surfaces 12. The groove 10 is undercut or reentrant, as seen at 14.

The outline of the projecting strip 9, in cross section, is circular, as shown by the broken line 9a, although the entire circular cross section need not be used, and the straight-line recess, as shown by the full line of FIG. 7, may be sufficient. The groove 10 is defined by circular areas shown, in cross section, on the projecting portions by the broken line 10a; again, it is not necessary to have the full circular cross section provided, and the somewhat undercut shape as shown by the full line of the portion defining the groove is sufficient. Any other cross-sectional shapes of the strip 9 and the fitting groove 10 can be used; it is only important that the strip 9 and the groove 10 have interengaging, interlocking regions or portions so that the head end portion of the strip 9 is slightly larger than its root portion, and, matching, the inner zone of the groove 10 is slightly larger than the outer edge zones. This interlocking, interengaging fit will prevent separation of adjacent edges of the tube or the tube quadrants 7a.

When the cover tube 7 is closed — see FIG. 3 — the strips 7a are liquid-tight and mechanically strongly connected together. Due to the interengaging profile of the strips 9 and the grooves 10, lateral forces of substantial magnitude can be applied on the strips 7a, without danger of splitting-apart of the adjacent edges or of the strips.

The cover 7 is opened only in the region of the spindle nut 2 along the longitudinal slits 8, in order to permit force transfer from the spindle nut 2 to an externally secured device. In order to permit such an external element, the hub 4 of the ring flange 3 has four passage slits 15, uniformly distributed about the circumference thereof, and so dimensioned that they can receive one of the strips 7a, each.

In accordance with a feature of the invention, two coaxial funnel-shaped outer cones 16 are secured to the hub 4 at respectively opposite edges thereof by screws 117. Matching inner cones 17 are located coaxially to the tube, and fitting within the outer cone 16. The inner cones 17 are secured to the nut 2, for example by an undercut groove into which the inner cones 17 can engage. A space 180 is defined between the outer and inner cones through which the cover strips 7a can pass. This space is so dimensioned that the cover strips 7a are reliably guided therein. The relatively matched and adjacent inner and outer cones 16, 17 form a two-element closing or guide cone or funnel, respectively, which are in operative connection with the strips defining the cover tube 7; they have respectively conically directed closing or separating surfaces 16a, 17a; whether the surfaces close or open the tube will depend on the direction of movement of the nut 2, the surfaces spreading the respective tube quadrants in advance of the nut 2 — in the direction of movement — and closing the respective quadrants therebehind. As can be seen, the cones extend up to and slightly beyond the circumferential closed position of the tube 7 so that the spindle 1 will not be left with any uncovered portions.

Operation: Let it be assumed that the nut 2 moves towards the right — with respect to FIG. 1. In such movement, the closed cover 7 — see FIG. 3 — is radially distended between the right inner cone 17 and outer cone 16. The circumferentially located remaining ribs 18 (FIG. 2) of the hub 4, between which the spaces 15 are defined, guide the strips 7a so that the cover tube 7 is continuously opened along the longitudinal slits 8. The ribs 9 will leave the respective grooves 10 in the direction of movement of the nut 2, which is entirely possible due to the elastic deformability of at least one of the elements forming the interengaging rib-and-groove connection.

The distended separated strips 7a are then guided towards each other again at the left side of the nut — with reference to FIG. 1 — by the inwardly directed closing cones 16, 17. The conically converging surfaces 16a, 17a continuously radially guide the strips towards each other. As the ribs 9 reach the region in which the longitudinal slits 8 approach each other, the ribs 9 will be guided by the cones 16, 17 into the associated grooves 10 while being subjected to continuous elastic deformation of the ribs and/or edge portions between the which the groove 10 is defined.

Opening and closing of the cover tube 7 thus is automatically obtained at both sides of the moving spindle nut 2, similar to a slide fastener, having continuous coupling elements in the form of shaped ribs 9 fitting into shaped grooves.

The inner region of the tube sections in the vicinity of their interengaging fit, that is, at the edges, are relieved or chamfered as shown by the angle 19 (FIG. 3) in order to insure that the longitudinal grooves 10 reliably receive the ribs 9 and snap behind the constricted mouth portion of the groove 10, thus closing the gaps or slits 8 without leaving any externally accessible gap.

Figure 2:
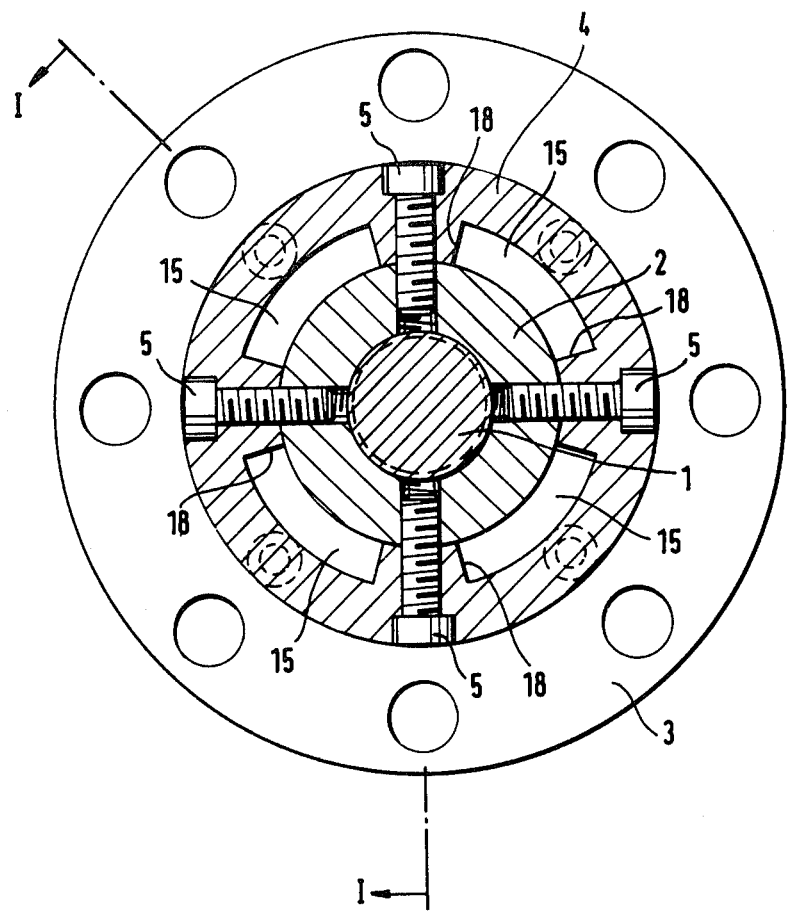
FIG. 2 is a section along line II—II of FIG. 1.
Figure 4:
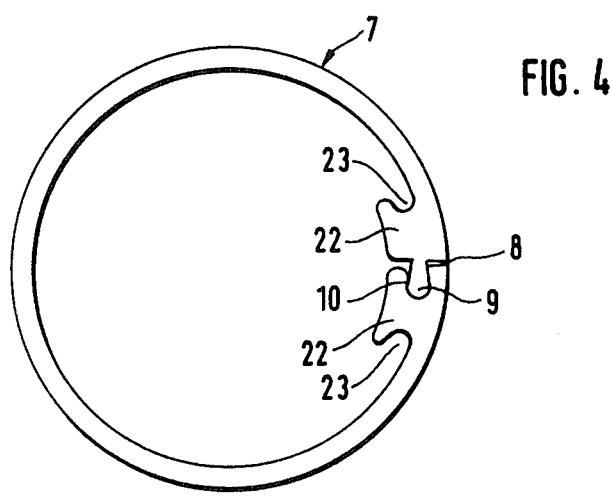
FIG. 4 is an end view of a single-element cover tube, shown closed.

The embodiment described in connection with FIGS. 1 and 2 utilizes four covers strips 7a to form the entire cover tube 7. The number of strips will depend on the size of the spindle 1 and the nut 2. The number of cover strips 7a can be selected, as desired, as necessary in relation to the diameter of the spindle 1 and the size of the nut 2. As illustrated in FIG. 4, small spindles with nuts of high-strength material can be formed with a single slit 8; this construction is particularly suitable if the tube 7 is made of a single integral uniform hose-like elastic plastic material. Only one groove-and-rib interlock 10, 9 will be needed. The specific construction and operation can be identical to that described in connection with FIGS. 1-3 and 5-7.

Figures 10, 11:
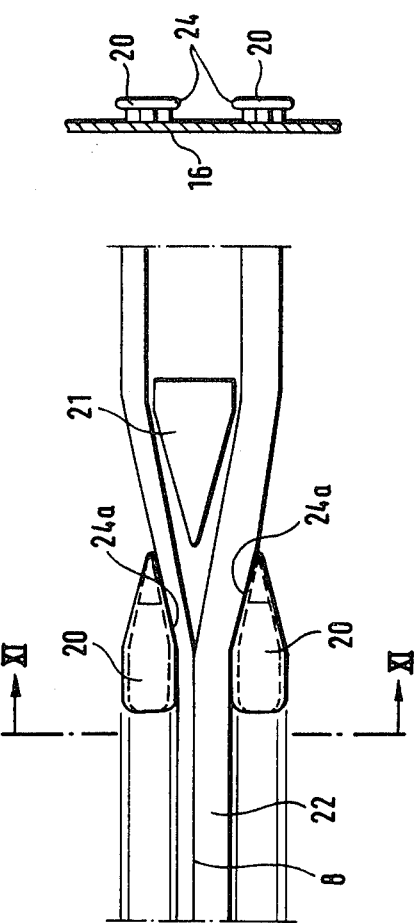
FIG. 10 is a cross-sectional view of the spindle drive along line X—X of FIG. 9, in developed representation, to illustrate closing and guide segments.
FIG. 11 is a part-sectional view, in developed form, of the closing segments to engage with guide grooves, taken along line XI—XI of FIG. 10.

Embodiment of FIGS. 8-10: The basic construction is the same, and parts previously described have been given the same reference numerals and will not be described again.

The outer cone 16 — see FIG. 10 — as well as the inner cone 17 are, each, formed with closing segments 20 and with opening segments 21. The shape of the segments is best seen in the developed or plan view of FIG. 10 and the fragmentary view of FIG. 11. The closing segments 20 as well as the distending or opening segments 21 are, essentially, conical, the arrangement being so made that each longitudinal slit 8 of the cover tube 7 has associated therewith a pair of closing segments 20 and an opening segment 21. Opening segment 21, of course, in the opposite direction, functions as a guide element for the closing segments 20. The shape is best seen in the developed view of FIG. 10, and in the part-sectional view of FIG. 11. The closing segments 20 and the opening segments 21 are in general wedge-shaped and so arranged that each longitudinal slit 8 of the cover tube 7 has a pair of closing segments 20 and an opening segment 21 associated therewith. The tips of the closing and opening segments, respectively, face each other. The closing segment 21 is offset by approximately half of the width of the cover strip with respect to the opening section 21. The wider portion of the closing segment is spaced from the spindle nut 2, the tip pointing away therefrom. The cover strips 7a of the cover tube 7 are formed with continuous longitudinal edges or shoulders 22 (FIGS. 3, 9) which extend parallel to the longitudinal slits 8 and are associated therewith in pairs. The shoulders 22, as seen for example in FIG. 3, are undercut to form a guide groove 23 which can be engaged by the projecting edges 24 (FIG. 11) of the closing segment 20. The cover strips 7a, thus, are positively guided within the region of the longitudinal slits 8. The projecting edges 24 form conically converging closing surfaces 24a — see FIG. 10.

Operation: Upon longitudinal movement of the spindle nut 2 with respect to the tube 7, the longitudinal slits 8 of the tube 7 are continuously opened in the leading direction and closed behind the nut 2, which is clearly apparent and seen in the developed view of FIG. 10.

The longitudinal ribs 22 are located at the outside of the cover 7, as is clearly seen in FIGS. 9 and 10. In the embodiment of FIGS. 3 and 4, the ribs 22 are located on the inside of the cover 7. If the ribs 22 are at the inside, the opening and closing elements 20, 21, respectively, are then applied at the inner cones. Although not usually necessary, similar ribs and grooves 21, 22 can be applied on both sides, with suitable opening and closing elements 20, 21 positioned as required to match the grooves 23 and effect opening and closing of the tube as the nut 2 moves.

The cover tube 7 frequently is made of a suitable elastic plastic material; the rib 9 can then be uniform with the plastic tube. The entire cover — see FIG. 4 — or separate cover strip 7a or 70a, respectively — can be made simply by extrusion. It is also possible to make the tube of stiffer material such as metal, and attach a rib 9 at an edge, made of elastic material, or, respectively, to attach an edge element which is formed with the groove 10, and also made of elastic material; or to form both the rib 9 and the groove element of elastic plastic material, joined to the remaining portions of the cover tube which can be made of different material, for example aluminum. The edge strip 9 can be molded or extruded conjointly with an aluminum strip, and made of inelastic material, only the edge strip which forms the groove being made of metal. This is sufficient, since the longitudinal slit 8 can be formed by permitting distension of the tube junction, since the flexible edge strip defining the groove 10 can resiliently deflect and slip off the edge having the rib 9.

Various changes and modifications may be made, and features described in connection with any one of the embodiments, or features thereof, may be used with any of the others, within the scope of the inventive concept.

We claim:

1. Automatically openable and recloseable protective cover (6) for an elongaged machine member (1), said member having an axially traveling element (2, 3) thereon, in which the cover is arranged for passage of the traveling element, said cover opening in advance of the element and reclosing therebehind, having an elongated tubular structure (7) formed with at least one continuous longitudinal slit (8), said slit defining two facing edges of the tubular structure, one of said edges being formed with a longitudinal groove (10) and the other of said edges with a projecting rib fitting into said groove;

means traveling with said traveling element and separating the rib from the groove in advance - looked at in the direction of travel of the traveling element - thereof, and reclosing said slit by reengagement of the rib into the groove behind the traveling element;

and wherein the protective cover (7) is an elastic tubular structure forming, in cross section, a closed ring-shaped structure entirely surrounding the machine member;

and the separating and reclosing means comprises a double funnel-shaped double cone structure (16), of essentially circular cross section surrounding the tubular protective cover and forming a double guide cone for the tubular protective cover in the region of separation and in the region of reclosing of the projecting rib (9) and the groove (10).

the double cone having the smaller cone portions facing in opposite direction.

said tubular structure being expandable in cross section in the region of said traveling element (2, 3) by opening of the slit upon separation of the rib from the groove to permit passage of at least a portion of the traveling element through the slit, said tubular structure being radially compressible to permit reclosing of the slit behind the traveling element, so that the machine member is totally enclosed by the tubular structure in advance and behind the traveling element, and in the region of the traveling element by the double funnelshaped double cone structure (16).

2. Cover according to claim 1, wherein (FIGS. 1-3, 5-11) the tubular structure comprises a plurality of parallel strips (7a), each said strip having, at one edge thereof, a projecting rib (9) and, at the other edge thereof, the longitudinal groove (10), the ridges and grooves of adjacent strips fitting into each other to form interengaging, interlocking but separable projection-and-recess means.

3. Cover according to claim 1, wherein one of said edges comprises a rigid material.

4. Cover according to claim 3, wherein said rigid material comprises metal.

5. Cover according to claim 1, wherein the projecting rib (9) and the longitudinal groove (10) have, in cross section, essentially circular shape.

6. Cover according to claim 1, wherein the tubular structure is formed with longitudinal shoulders (22) adjacent said edges;

and the double funnel-shaped double cone structure (16) forming the guide cone is formed with engagement elements (20, 21) engaging said longitudinal shoulders.

7. Cover according to claim 6, wherein the longitudinal shoulders define a guide groove (23), and the engagement elements include closing elements (20) engaging and fitting into said guide grooves.

8. Cover according to claim 6, wherein (FIG. 9) said longitudinal shoulders are located at the outside of the tubular structure (7).

9. Cover according to claim 6, wherein (FIGS. 1–7) said longitudinal shoulders are located only on the inside of the tube, and the outer circumference of the cover tube is smooth, the edges thereof fitting gapless closely against each other.

10. Cover according to claim 1, wherein the double funnel-shaped double cone structure comprises inner and outer funnel-shaped elements (16, 17), located concentrically within each other to form an inner guide cone and an outer guide cone surrounding the tubular protective cover;

and wherein the tubular structure (7) is guided in a guide space (15, 180) between said inner and outer guide cones.

11. Cover according to claim 8, wherein the double funnel-shaped double cone structure comprises inner and outer funnel shaped elements (16, 17), located concentrically within each other to form an inner guide cone and an outer guide cone surrounding the tubular protective cover;

wherein the tubular structure (7) is guided in a guide space (15, 180) between said inner and outer guide cones;

and wherein the engagement elements (20, 21) are located on the outer guide cone (16).

12. Cover according to claim 8, wherein the double funnel-shaped double cone structure comprises inner and outer funnel-shaped elements (16, 17), located concentrically within each other to form an inner guide cone and an outer guide cone surrounding the tubular protective cover;

wherein the tubular structure (7) is guided in a guide space (15, 180) between said inner and outer guide cones;

and wherein the engagement elements (20, 21) are located on the inner guide cone (17).

13. Cover according to claim 2, wherein the traveling element includes a hub element (4) formed with part-circumferential axially extending openings (15) therethrough, and dimensioned to accept, each, one of said strips (7a);

and said funnel-shaped structure (16) includes a conically converging guide surface (16a) extending from said openings towards the elongated member and terminating at a circumferential position conforming to the size of the tubular structure (7) when the projecting rib (9) is fitted in and in engagement with said longitudinal groove (10).

14. Cover according to claim 6, wherein the longitudinal shoulders (23) adjacent said edges define inwardly directed, wedge-shaped shoulders;

and wherein the double funnel-shaped double cone structure comprises engagement surfaces (24a) on the engagement elements (20, 21) engaging in said guide groove.

15. Cover according to claim 2, wherein said longitudinal shoulders (23) are formed adjacent the edges of at least two parallel strips which face each other.

16. Cover according to claim 2, wherein the tubular structure is formed with longitudinal shoulders (22) adjacent all the edges of all the strips.

17. Cover according to claim 15, wherein the double funnel-shaped double cone structure forming the guide cone is formed with engagement elements (20, 21) engaging said longitudinal shoulders.

18. Cover according to claim 17, wherein the longitudinal shoulders define a guide groove (23), and the engagement elements include closing elements (20) engaging and fitting into said guide grooves.

19. Cover according to claim 16, wherein the double funnel-shaped double cone structure forming the guide cone is formed with engagement elements (20, 21) engaging said longitudinal shoulders.

20. Cover according to claim 19, wherein the longitudinal shoulders define a guide groove, and the engagement elements include closing elements (20) engaging and fitting into said guide grooves.

* * * * *